(12) United States Patent
Lee

(10) Patent No.: US 11,432,019 B2
(45) Date of Patent: *Aug. 30, 2022

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,922

(22) Filed: Dec. 18, 2020

(65) Prior Publication Data

US 2021/0105507 A1  Apr. 8, 2021

Related U.S. Application Data

(63) Continuation of application No. 16/347,852, filed as application No. PCT/KR2017/012617 on Nov. 8, 2017, now Pat. No. 10,904,581.

(30) Foreign Application Priority Data

Nov. 8, 2016 (KR) .......... 10-2016-0148179
Nov. 8, 2016 (KR) .......... 10-2016-0148180

(51) Int. Cl.
*H04N 19/91* (2014.01)
*H04N 19/96* (2014.01)
*H04N 19/124* (2014.01)
*H04N 19/176* (2014.01)
*H04N 19/44* (2014.01)
(Continued)

(52) U.S. Cl.
CPC .......... *H04N 19/96* (2014.11); *H04N 19/119* (2014.11); *H04N 19/124* (2014.11); *H04N 19/132* (2014.11); *H04N 19/159* (2014.11); *H04N 19/174* (2014.11); *H04N 19/176* (2014.11); *H04N 19/44* (2014.11); *H04N 19/46* (2014.11); *H04N 19/70* (2014.11)

(58) Field of Classification Search
CPC .... H04N 19/96; H04N 19/119; H04N 19/124; H04N 19/132; H04N 19/159; H04N 19/174; H04N 19/176; H04N 19/44; H04N 19/46; H04N 19/70
See application file for complete search history.

(56) References Cited

U.S. PATENT DOCUMENTS

2010/0299538 A1* 11/2010 Miller .................. H04L 9/0637
380/28
2011/0170610 A1  7/2011 Min et al.
(Continued)

FOREIGN PATENT DOCUMENTS

JP   5972888 B2   8/2016
KR   10-2014-0142199 A   12/2014
(Continued)

*Primary Examiner* — Howard D Brown, Jr.
(74) *Attorney, Agent, or Firm* — IP Legal Services, LLC

(57) ABSTRACT

A method for decoding a video according to the present invention may comprise: determining whether to divide a current block with quad tree partitioning, and dividing the current block into four partitions based on a vertical line and a horizontal line when it is determined that the current block is divided with the quad tree partitioning.

9 Claims, 13 Drawing Sheets

(51) Int. Cl.
  *H04N 19/174*     (2014.01)
  *H04N 19/132*     (2014.01)
  *H04N 19/46*      (2014.01)
  *H04N 19/119*     (2014.01)
  *H04N 19/70*      (2014.01)
  *H04N 19/159*     (2014.01)

(56) References Cited

U.S. PATENT DOCUMENTS

| | | | |
|---|---|---|---|
| 2013/0089265 A1 | 4/2013 | Yie et al. | |
| 2013/0108182 A1* | 5/2013 | Yie | G06T 9/004 382/233 |
| 2013/0129237 A1* | 5/2013 | Yie | H04N 19/44 382/233 |
| 2014/0226719 A1* | 8/2014 | Yamamoto | H04N 19/91 375/240.12 |
| 2014/0294077 A1 | 10/2014 | Min et al. | |
| 2015/0010079 A1 | 1/2015 | Yie et al. | |
| 2015/0010080 A1 | 1/2015 | Yie et al. | |
| 2015/0010081 A1 | 1/2015 | Yie et al. | |
| 2015/0010085 A1 | 1/2015 | Yie et al. | |
| 2015/0010086 A1 | 1/2015 | Yie et al. | |
| 2015/0010243 A1 | 1/2015 | Yie et al. | |
| 2015/0010244 A1 | 1/2015 | Yie et al. | |
| 2015/0016737 A1 | 1/2015 | Yie et al. | |
| 2015/0016738 A1 | 1/2015 | Yie et al. | |
| 2015/0016739 A1 | 1/2015 | Yie et al. | |
| 2015/0016740 A1 | 1/2015 | Yie et al. | |
| 2015/0016741 A1 | 1/2015 | Yie et al. | |
| 2015/0131717 A1 | 5/2015 | Min et al. | |
| 2015/0131718 A1 | 5/2015 | Min et al. | |
| 2015/0139312 A1 | 5/2015 | Min et al. | |
| 2015/0139313 A1 | 5/2015 | Min et al. | |
| 2015/0208091 A1 | 7/2015 | Yie et al. | |
| 2015/0256841 A1 | 9/2015 | Yie et al. | |
| 2015/0264352 A1 | 9/2015 | Yie et al. | |
| 2015/0281688 A1 | 10/2015 | Yie et al. | |
| 2015/0281735 A1 | 10/2015 | Park et al. | |
| 2015/0312588 A1 | 10/2015 | Yamamoto et al. | |
| 2016/0165264 A1 | 6/2016 | Min et al. | |
| 2017/0208336 A1* | 7/2017 | Li | H04N 19/176 |
| 2017/0272750 A1 | 9/2017 | An et al. | |
| 2017/0310991 A1 | 10/2017 | Yamamoto et al. | |
| 2018/0063528 A1 | 3/2018 | An et al. | |
| 2018/0098097 A1* | 4/2018 | Huang | H04N 19/70 |
| 2018/0139453 A1* | 5/2018 | Park | H04N 19/159 |
| 2018/0184122 A1 | 6/2018 | Park et al. | |
| 2018/0249187 A1 | 8/2018 | Min et al. | |
| 2018/0376155 A1 | 12/2018 | Yamamoto et al. | |
| 2019/0110070 A1 | 4/2019 | Yamamoto et al. | |

FOREIGN PATENT DOCUMENTS

| | | |
|---|---|---|
| KR | 10-2016-0030146 A | 3/2016 |
| KR | 10-1667282 B1 | 10/2016 |
| WO | 2016/091161 A1 | 6/2016 |

\* cited by examiner

2N×2N    N×2N    2N×N    N×N nL×2N    nR×2N    2N×nU    2N×nD

METHOD AND APPARATUS FOR PROCESSING VIDEO SIGNAL

CROSS REFERENCE TO RELATED APPLICATIONS

This application is a Continuation of U.S. patent application Ser. No. 16/647,852 (filed on May 7, 2019), which is a National Stage Patent Application of PCT International Patent Application No. PCT/KR2017/012617 (filed on Nov. 8, 2017) under 35 U.S.C. § 371, which claims priority to Korean Patent Application Nos. 10-2016-0148179 (filed on Nov. 8, 2016) and 10-2016-0148180 (filed on Nov. 8, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently splitting an encoding/decoding target block in encoding/decoding a video signal.

An object of the present invention is to provide a method and an apparatus for splitting an encoding/decoding target block into blocks of a symmetric type or an asymmetric type in encoding/decoding a video signal.

An object of the present invention is to provide a method and an apparatus for splitting an encoding/decoding target block to comprise a polygonal shaped partition.

An object of the present invention is to provide a method and an apparatus for variably selecting the number of partitions of the encoding/decoding target block.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may determine whether to divide a current block with quad tree partitioning, and divide the current block into four partitions based on a vertical line and a horizontal line when it is determined that the current block is divided with the quad tree partitioning. Here, at least one of the vertical line and the horizontal line may divide the current block asymmetrically.

A method and an apparatus for encoding a video signal according to the present invention may determine whether to divide a current block with quad tree partitioning, and divide the current block into four partitions based on a vertical line and a horizontal line when it is determined that the current block is divided with the quad tree partitioning. Here, at least one of the vertical line and the horizontal line may divide the current block asymmetrically.

In the method and the apparatus for encoding/decoding a video signal according to the present invention, a first indicator indicating whether at least one of the vertical line or the horizontal line is to be used for asymmetric partitioning may be decoded/encoded, and a second indicator may be decoded/encoded to specify a location of the vertical line or the horizontal line when the first indicator indicates that the vertical line or the horizontal line is used for the asymmetric partitioning.

In the method and the apparatus for encoding/decoding a video signal according to the present invention, the current block may be divided into four partitions by two horizontal lines and one vertical line which dividing one of three blocks divided by the two horizontal lines, or by two vertical lines and one horizontal line which dividing one of three blocks divided by the two vertical lines.

In the method and the apparatus for encoding/decoding a video signal according to the present invention, whether to divide the current block with binary tree partitioning may be determined when it is determined that the current block is not divided with the quad tree partitioning, and the current block may be divided into two partitions when it is determined that the current block is divided with the binary tree partitioning.

In the method and the apparatus for encoding/decoding a video signal according to the present invention, whether polygon binary tree partitioning is to be applied to the current block may be determined, and when the polygon binary tree partitioning is applied to the current block, the current block may be divided into a rectangular shaped partition and a polygonal shaped partition.

In the method and the apparatus for encoding/decoding a video signal according to the present invention, the polygonal shaped partition may be divided into sub-partitions of rectangular shapes and prediction on the polygonal shaped partition is performed for each sub-partition.

In the method and the apparatus for encoding/decoding a video signal according to the present invention, the current block may be divided by a vertical line or a horizontal line dividing the current block into two partitions, and the vertical line or the horizontal line may divide the current block asymmetrically.

The features briefly summarized above for the present invention are only illustrative aspects of the detailed description of the invention that follows, but do not limit the scope of the invention.

Advantageous Effects

According to the present invention, encoding/decoding efficiency can be improved by efficiently splitting an encoding/decoding target block.

According to the present invention, encoding/decoding efficiency can be improved by splitting an encoding/decoding target block into blocks of a symmetric type or an asymmetric type.

According to the present invention, encoding/decoding efficiency can be improved by splitting an encoding/decoding target block to comprise polygonal shaped partition.

According to the present invention, encoding/decoding efficiency can be improved by variably selecting the number of partitions of the encoding/decoding target block.

The effects obtainable by the present invention are not limited to the above-mentioned effects, and other effects not mentioned can be clearly understood by those skilled in the art from the description below.

MODE FOR INVENTION

Figure 1:
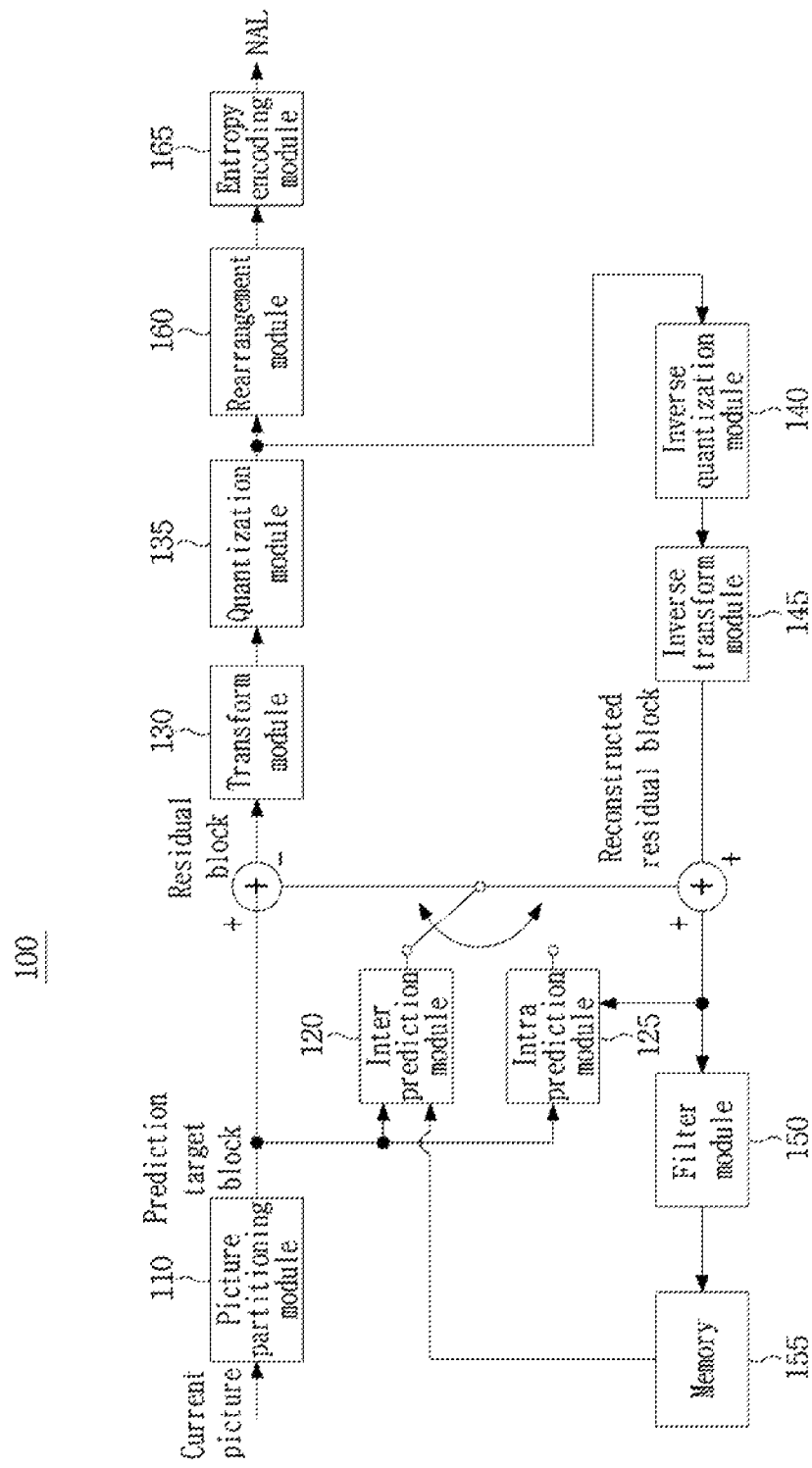
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
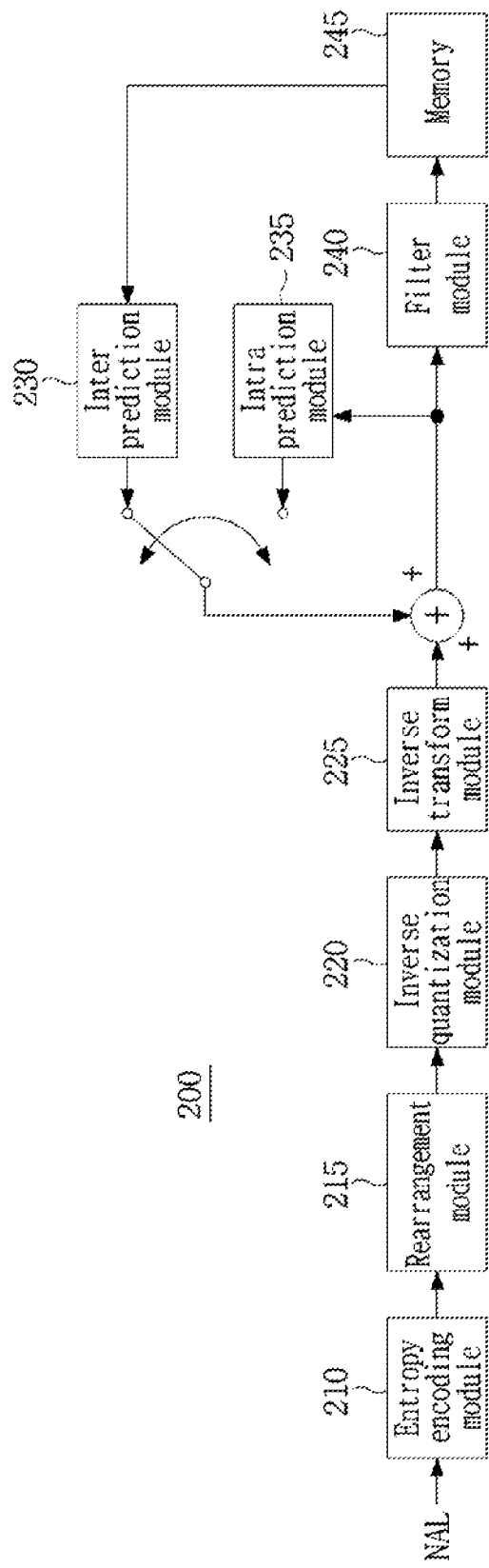
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this specification, 'unit' represents a basic unit for performing a specific encoding/decoding processes, and 'block' may represent a sample array of a predetermined size. If there is no distinguish between them, the terms 'block' and 'unit' may be used interchangeably. For example, in the embodiments described below, it can be understood that a coding block and a coding unit have mutually equivalent meanings.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Alternatively, if a coding block is determined, a prediction block having the same size as the coding block or smaller than the coding block may be determined through predictive partitioning of the coding block. The predictive partitioning of the coding block may be performed by a partition mode (Part mode) indicating a partition type of the coding block. A size or a shape of a prediction block may be determined according to the partition mode of the coding block. The partition type of the coding block may be determined through information specifying any one of partition candidates. At this time, depending on a size, a shape, an encoding mode or the like of the coding block, the partition candidates available to the coding block may include an asymmetric partition type (for example, nL×2N, nR×2N, 2N×nU, 2N×nD). For example, the partition candidates available to the coding block may be determined according to the encoding mode of the current block. For example, FIG. 3 illustrates partition modes that can be applied to a coding block when the coding block is encoded by inter prediction.

Figure 3:
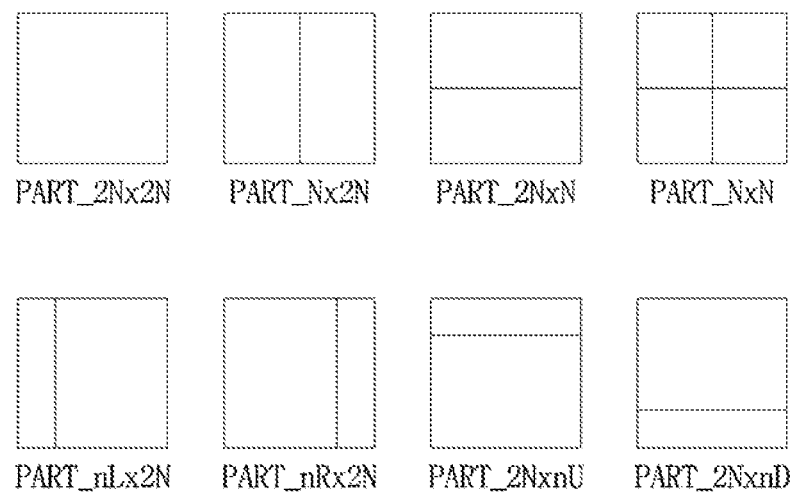
FIG. 3 is a diagram illustrating partition modes that can be applied to a coding block when the coding block is encoded by inter prediction.

When a coding block is encoded by inter prediction, one of 8 partition modes can be applied to the coding block, as in the example shown in FIG. 3.

On the other hand, when a coding block is encoded by intra prediction, a partition mode of PART_2N×2N or PART_N×N can be applied to the coding block.

PART_N×N may be applied when a coding block has a minimum size. Here, the minimum size of the coding block may be predefined in the encoder and the decoder. Alternatively, information regarding the minimum size of the coding block may be signaled via the bitstream. For example, the minimum size of the coding block is signaled through a slice header, so that the minimum size of the coding block may be defined for each slice.

In another example, partition candidates available to a coding block may be determined differently depending on at least one of a size or a shape of the coding block. For example, the number or a type of partition candidates available to a coding block may be differently determined according to at least one of a size or a shape of the coding block.

Alternatively, a type or the number of asymmetric partition candidates among partition candidates available to a coding block may be limited depending on a size or a shape of the coding block. For example, the number or a type of asymmetric partition candidates available to a coding block may be differently determined according to at least one of a size or a shape of the coding block.

In general, a prediction block may have a size from 64×64 to 4×4. However, when a coding block is encoded by inter prediction, it is possible to prevent the prediction block from having a 4×4 size in order to reduce a memory bandwidth when performing motion compensation.

It is also possible to recursively divide a coding block using a partition mode. That is, a coding block can be divided according to the partition mode indicated by a partition index, and each partition generated by dividing the coding block can be defined as a coding block.

Hereinafter, a method of recursively dividing a coding unit will be described in more detail. For convenience of explanation, it is assumed that a coding tree unit is also included in a category of a coding unit. That is, in a later-described embodiment, a coding unit may refer to a coding tree unit, or may refer to a coding unit which is generated by dividing the coding tree unit. Also, when a coding block is recursively divided, it can be understood that the 'partition' generated by dividing the coding block means 'coding block'.

A coding unit may be divided by at least one line. At this time, the line dividing the coding unit may have a predetermined angle. Here, the predetermined angle may be a value within a range of 0 degree to 360 degree. For example, a line of 0 degree may mean a horizontal line, a line of 90 degree may mean a vertical line, and a line of 45 degree or 135 degree may mean a diagonal line.

When a coding unit is divided by a plurality of lines, all of the plurality of lines may have the same angle. Alternatively, at least one of the plurality of lines may have an angle different from the other lines. Alternatively, the plurality of lines dividing a coding tree unit or a coding unit may be set to have a predefined angle difference (e.g., 90 degree).

Information about a line dividing a coding tree unit or a coding unit may be defined and encoded as a partition mode. Alternatively, information on the number of lines, a direction of a line, an angle of a line, a position of a line in a block, or the like may be encoded.

For convenience of explanation, it is assumed in the following embodiments that a coding tree unit or a coding unit is divided into a plurality of coding units using at least one of a vertical line and a horizontal line.

If it is assumed that partitioning of a coding unit is performed based on at least one of a vertical line and a horizontal line, the number of vertical lines or horizontal lines partitioning the coding unit may be at least one or more. For example, the coding tree unit or the coding unit may be divided into two partitions using one vertical line or one horizontal line, or the coding unit may be divided into three partitions using two vertical lines or two horizontal lines. Alternatively, the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size. Alternatively, any one partition may have a different size from the remaining partitions, or each partition may have a different size.

In the embodiments described below, it is assumed that dividing a coding unit into 4 partitions is a quad-tree based partitioning and dividing a coding unit into 2 partitions is a binary-tree based partitioning. In the following figures, it is assumed that a predetermined number of vertical lines or a predetermined number of horizontal lines are used to divide a coding unit, but it is also within a scope of the present invention to divide a coding unit into more number of partitions than shown in the figures using a more number of vertical lines or a more number of horizontal lines shown in the figures, or to divide a coding unit into less number of partitions than shown in the figures.

Figure 4:
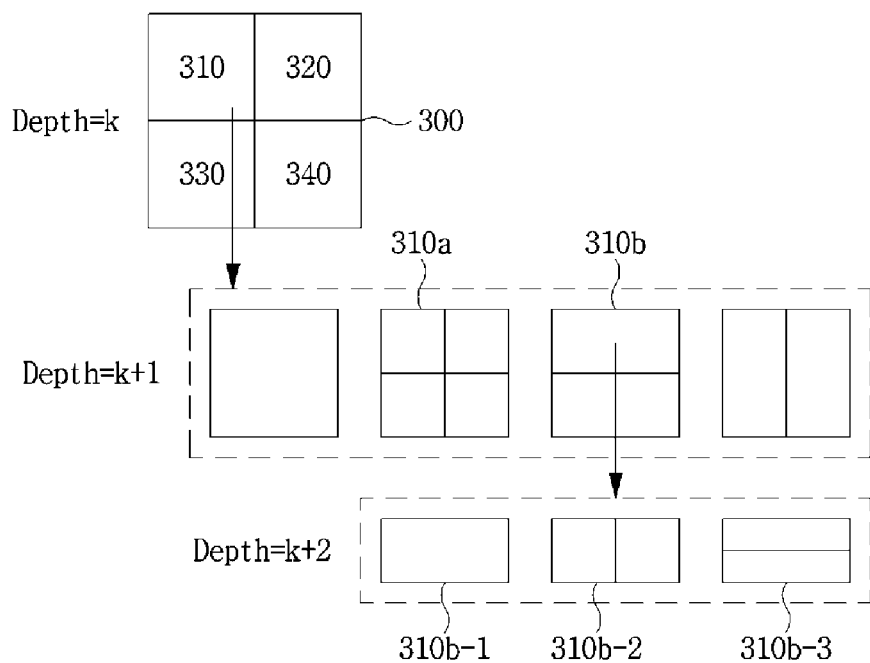
FIG. 4 is a diagram illustrating an example of hierarchically partitioning a coding block based on a tree structure according to an embodiment of the present invention.

FIG. 4 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Figure 5:
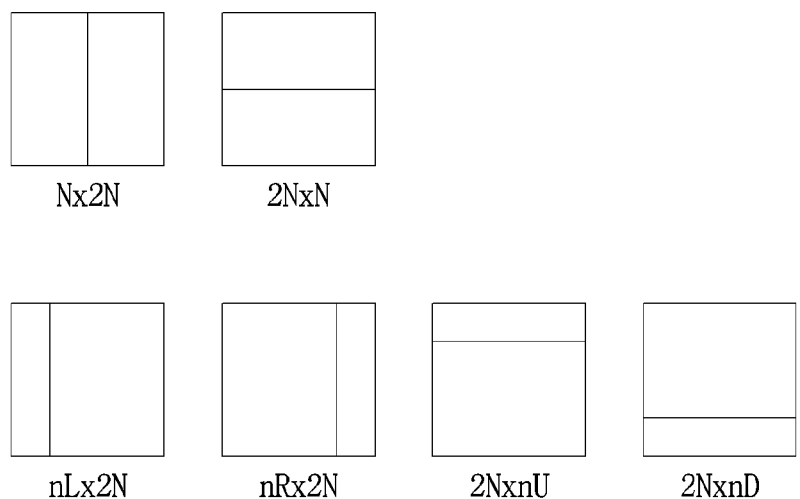
FIG. 5 is a diagram illustrating a partition type in which binary tree-based partitioning is allowed according to an embodiment of the present invention.

Binary tree-based partitioning may be symmetrically or asymmetrically performed. In addition, the coding block partitioned based on the binary tree may be a square block or a non-square block, such as a rectangular shape. For example, as an example illustrated in FIG. 5, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 6A:
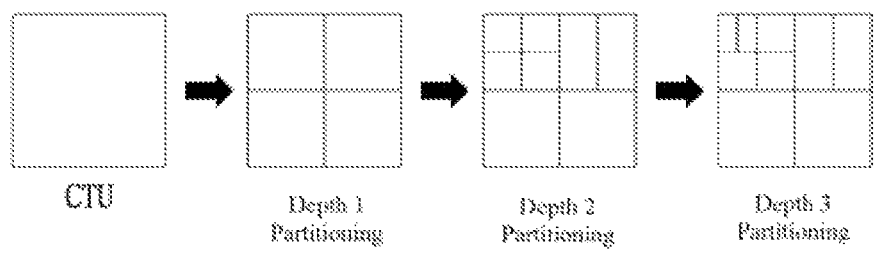
FIGS. 6A and 6B are diagrams illustrating an example in which only a binary tree-based partition of a predetermined type is allowed according to an embodiment of the present invention.
Figure 6B:
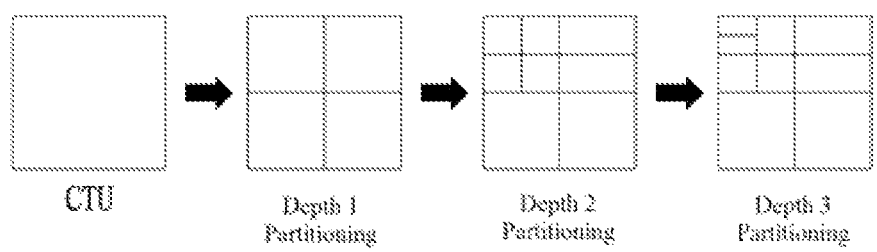

FIGS. 6A and 6B are diagrams illustrating an example in which only a specific type of binary tree-based partitioning is allowed. FIG. 6A shows an example in which only N×2N type of binary tree-based partitioning is allowed, and FIG. 6B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction, a horizontal direction, or the like may be used. For example, quad_split_flag indicates whether the coding block is to be divided into four coding blocks, and binary_split_flag indicates whether the coding block is to be divided into two coding blocks. When the coding block is divided into two coding blocks, is_hor_split_flag indicating whether a partitioning direction of the coding block is a vertical direction or a horizontal direction may be signaled.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in units of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 7:
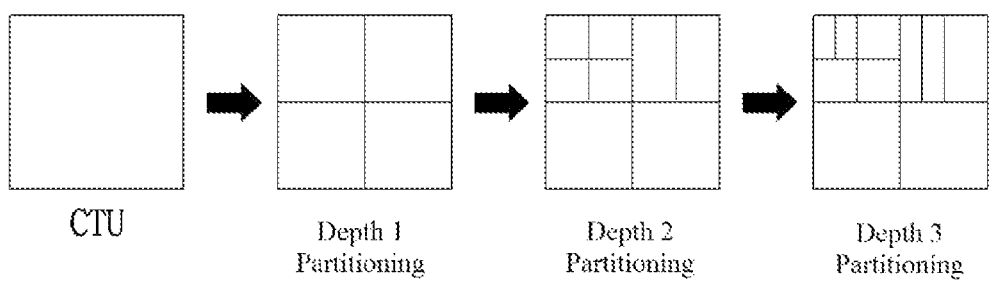
FIG. 7 is a diagram for explaining an example in which information related to the allowable number of binary tree partitioning is encoded/decoded, according to an embodiment to which the present invention is applied.

Referring to the example shown in FIG. 7, in FIG. 7, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 4, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

As a result of a division based on the quadtree and the binary tree, a coding block which is not further partitioned can be used as a prediction block or a transform block. That is, in a QTBT partitioning method based on a quad tree and binary tree, a coding block may become a prediction block and a prediction block may become a transform block. For example, when the QTBT partitioning method is used, a prediction image may be generated in a unit of a coding block, and a residual signal, which is a difference between an original image and the prediction image, is transformed in a unit of a coding block. Here, generating the prediction image in a unit of a coding block may mean that motion information is determined for a coding block or an intra prediction mode is determined for a coding block. Accordingly, a coding block can be encoded using at least one of a skip mode, intra prediction, or inter prediction.

As another example, it is also possible to use a prediction block or a transform block having a smaller size than a coding block by dividing the coding block.

In the QTBT partitioning method, it may be set that only symmetric partitioning is allowed in BT. However, if only symmetric binary partitioning is allowed even though an object and a background are divided at a block boundary, coding efficiency may be lowered. Accordingly, in the present invention, a method of partitioning a coding block asymmetrically is proposed in order to increase the coding efficiency.

Asymmetric binary tree partitioning represents dividing a coding block into two smaller coding blocks. As a result of the asymmetric binary tree partitioning, the coding block may be divided into two coding blocks of an asymmetric form. For convenience of explanation, in the following embodiments, dividing a coding block into two partitions of a symmetrical form will be referred to as a binary tree partition (or binary tree partitioning), and dividing a coding block into tow partitions of an asymmetric form will be referred to as an asymmetric binary tree partition (or asymmetric binary tree partitioning).

Figure 8:
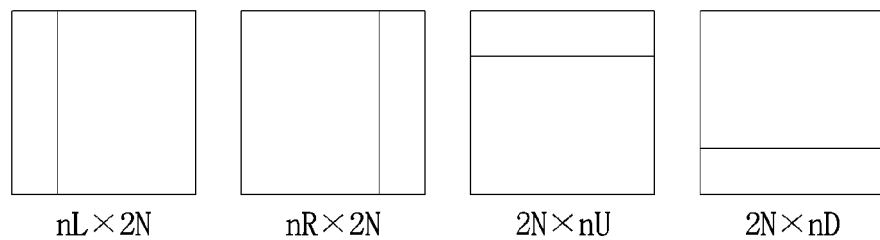
FIG. 8 illustrates a partition type of a coding block based on asymmetric binary tree partitioning.

FIG. 8 illustrates a partition type of a coding block based on asymmetric binary tree partitioning. A coding block of 2N×2N may be divided into two coding blocks whose width ratio is n:(1−n) or two coding blocks whose height ratio is n:(1−n). Where n may represent a real number greater than 0 and less than 1.

It is illustrated in FIG. 8 that two coding blocks whose width ratio is 1:3 or 3:1 or whose height ratio is 1:3 or 3:1 are generated by applying the asymmetric binary tree partitioning to a coding block.

Specifically, as a coding block of W×H size is partitioned in a vertical direction, a left partition whose width is ¼W and a right partition whose width is ¾W may be generated. As described above, a partition type in which the width of the left partition is smaller than the width of the right partition can be referred to as nL×2N binary partition.

As a coding block of W×H size is partitioned in a vertical direction, a left partition whose width is ¾W and a right partition whose width is ¼W may be generated. As described above, a partition type in which the width of the right partition is smaller than the width of the left partition can be referred to as nR×2N binary partition.

As a coding block of W×H size is partitioned in a horizontal direction, a top partition whose width is ¼H and a bottom partition whose width is ¾H may be generated. As described above, a partition type in which the height of the top partition is smaller than the height of the bottom partition can be referred to as 2N×nU binary partition.

As a coding block of W×H size is partitioned in a horizontal direction, a top partition whose width is ¾H and a bottom partition whose width is ¼H may be generated. As described above, a partition type in which the height of the bottom partition is smaller than the height of the top partition can be referred to as 2N×nD binary partition.

In FIG. 8, it is illustrated that a width ratio or a height ratio between two coding blocks is 1:3 or 3:1. However, the width ratio or the height ratio between two coding blocks generated by asymmetric binary tree partitioning is not limited thereto. The coding block may be partitioned into two coding blocks having different width ratio or different height ratio from those shown in the FIG. 8.

When the asymmetric binary tree partitioning is used, an asymmetric binary partition type of a coding block may be determined based on information signaled via a bitstream. For example, a partition type of a coding block may be determined based on information indicating a partitioning direction of the coding block and information indicating whether a first partition, generated by dividing the coding block, has a smaller size than a second partition.

The information indicating the partitioning direction of the coding block may be a flag of 1 bit indicating whether the coding block is partitioned in a vertical direction or in a horizontal direction. For example, hor_binary_flag may indicate whether the coding block is partitioned in a horizontal direction. If a value of hor_binary_flag is 1, it may indicate that the coding block is partitioned in the horizontal direction and if the value of hor_binary_flag is 0, it may indicate that the coding block is partitioned in the vertical direction. Alternatively, ver_binary_flag indicating whether or not the coding block is partitioned in the vertical direction may be used.

The information indicating whether the first partition has a smaller size than the second partition may be a flag of 1 bit. For example, is_left_above_small_part_flag may indicate whether a size of a left or top partition generated by dividing the coding block is smaller than a right or bottom partition. If a value of is_left_above_small_part_flag is 1, it means that the size of the left or top partition is smaller than the right or bottom partition. If the value of is_left_above_small_part_flag is 0, it means that the size of the left or top partition is larger than the right or bottom partition. Alternatively, is_right_bottom_small_part_flag indicating whether the size of the right or bottom partition is smaller than the left or top partition may be used.

Alternatively, sizes of a first partition and a second partition may be determined by using information indicating a width ratio, a height ratio or an area ratio between the first partition and the second partition.

When a value of hor_binary_flag is 0 and a value of is_left_above_small_part_flag is 1, it may represent nL×2N binary partition, and when a value of hor_binary_flag is 0 and a value of is_left_above_small_part_flag is 0, it may represent nR×2N binary partition. In addition, when a value of hor_binary_flag is 1 and a value of is_left_above_small_part_flag is 1, it may represent 2N×nU binary partition, and when a value of hor_binary_flag is 1 and a value of is_left_above_small_part_flag is 0, it may represent 2N×nD binary partition.

As another example, the asymmetric binary partition type of the coding block may be determined by index information indicating a partition type of the coding block. Here, the index information is information to be signaled through a bitstream, and may be encoded with a fixed length (i.e., a fixed number of bits) or may be encoded with a variable length. For example, Table 1 below shows the partition index for each asymmetric binary partition.

TABLE 1

| | Asymmetric partition index | Binarization |
|---|---|---|
| nLx2N | 0 | 0 |
| nRx2N | 1 | 10 |
| 2NxnU | 2 | 100 |
| 2NxnD | 3 | 111 |

Asymmetric binary tree partitioning may be used depending on the QTBT partitioning method. For example, if the quadtree partitioning or the binary tree partitioning is no longer applied to the coding block, it may be determined whether or not to apply asymmetric binary tree partitioning to the coding block. Here, whether or not to apply the asymmetric binary tree partitioning to the coding block may be determined by information signaled through the bitstream. For example, the information may be a 1 bit flag 'asymmetric binary tree flag', and based on the flag, it may be determined whether the asymmetric binary tree partitioning is to be applied to the coding block.

Alternatively, when it is determined that the coding block is partitioned into two blocks, it may be determined whether the partition type is binary tree partitioning or asymmetric binary tree partitioning. Here, whether the partition type of the coding block is the binary tree partitioning or the asymmetric binary tree partitioning may be determined by information signaled through the bitstream. For example, the information may be a 1 bit flag 'is_asymmetric_split_flag', and based on the flag, it may be determined whether the coding block is to be partitioned into a symmetric form or an asymmetric from.

As another example, indexes assigned to symmetric type binary partitions and to asymmetric type binary partitions may be different, and it may be determined based on index information whether the coding block is to be partitioned in a symmetric type or an asymmetric type. For example, Table 2 shows an example in which different indexes are assigned to symmetric binary type partitions and asymmetric binary type partitions.

TABLE 2

| | Binary partition index | Binarization |
|---|---|---|
| 2NxN (Binary partition in horizontal direction) | 0 | 0 |
| Nx2N (Binary partition in vertical direction) | 1 | 10 |
| nLx2N | 2 | 110 |
| nRx2N | 3 | 1110 |
| 2NxnU | 4 | 11110 |
| 2NxnD | 5 | 11111 |

Figure 9:
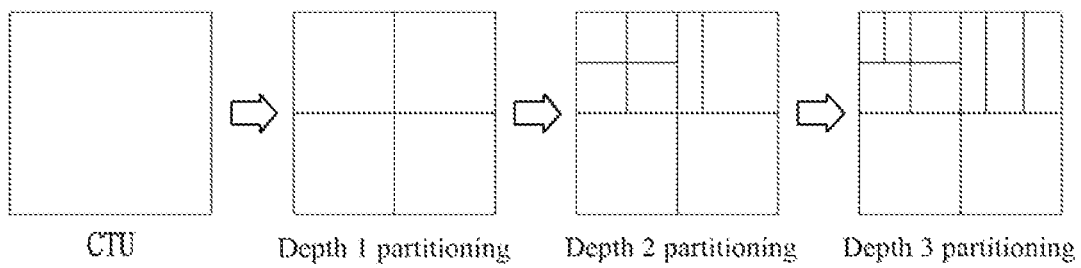
FIG. 9 shows an example in which a coding block is divided into a plurality of coding blocks using QTBT and asymmetric binary tree partitioning.
Figure 9:
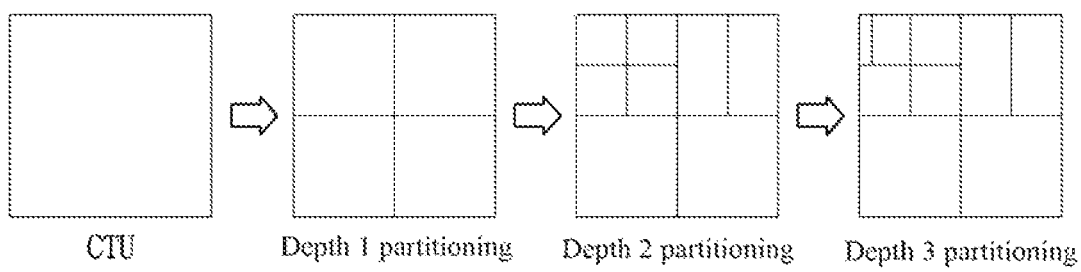
Figure 9:
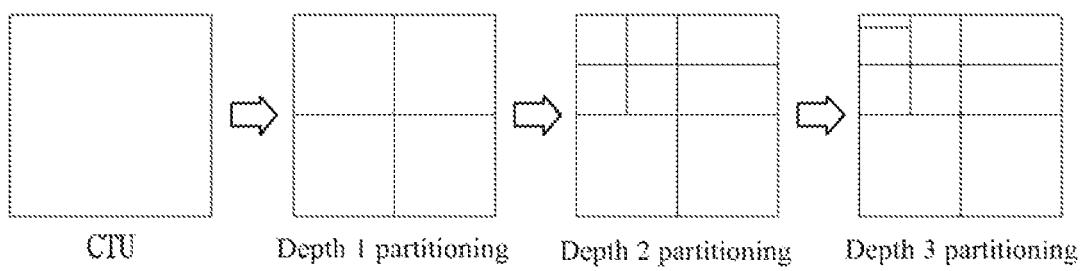

A coding tree block or a coding block may be divided into a plurality of coding blocks by quad tree partitioning, binary tree partitioning or asymmetric binary tree partitioning. For example, FIG. 8 shows an example in which a coding block is divided into a plurality of coding blocks using QTBT and asymmetric binary tree partitioning. Referring to FIG. 9, it can be seen that the asymmetric binary tree partitioning is performed in depth 2 partitioning in the first drawing, depth 3 partitioning in the second drawing, and depth 3 partitioning in the third drawing, respectively.

It may be restricted that a coding block divided by the asymmetric binary tree partitioning is no longer divided. For example, information related to a quadtree, binary tree, or asymmetric binary tree may not be encoded/decoded for a coding block which is generated by the asymmetric binary tree partitioning. That is, for a coding block generated through the asymmetric binary tree partitioning, a flag indicating whether quadtree partitioning is applied, a flag indicating whether binary tree partitioning is applied, a flag indicating whether asymmetric binary tree partitioning is applied, a flag indicating a direction of the binary tree partitioning or the asymmetric binary tree partitioning, or index information indicating an asymmetric binary partition, or the like may be omitted.

As another example, whether or not to allow the binary tree partitioning may be determined depending on whether the QTBT is allowed or not. For example, in a picture or slice in which the QTBT-based partitioning method is not used, it may be restricted not to use the asymmetric binary tree partitioning.

Information indicating whether the asymmetric binary tree partitioning is allowed may be encoded and signaled in a unit of a block, a slice or a picture. Here, the information indicating whether the asymmetric binary tree partitioning is allowed may be a flag of 1 bit. For example, if a value of is_used_asymmetric_QTBT_enabled_flag is 0, it may indicate that the asymmetric binary tree partitioning is not used. It is also possible that is_used_asymmetric_QTBT_enabled_ Flag is set to 0 without signaling thereof when the binary tree partitioning is not used in a picture or a slice.

It is also possible to determine a partition type allowed in a coding block based on a size, a shape, a partition depth, or a partition type of the coding block. For example, at least one of partition types, partition shapes or a number of partitions allowed in a coding block generated by the quad tree partitioning and in a coding block generated by the binary tree partitioning may be different from each other.

Figure 10:
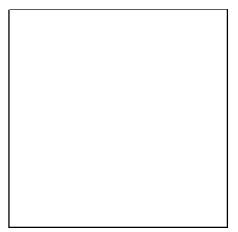
FIG. 10 is a diagram illustrating partition types which can be applied to a coding block.
Figure 10:
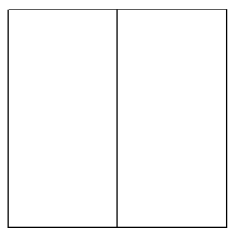
Figure 10:
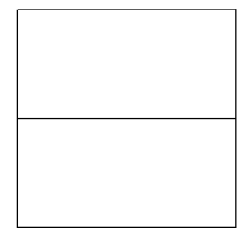
Figure 10:
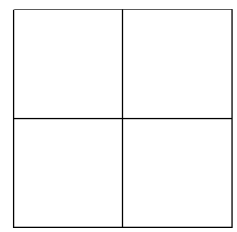
Figure 10:
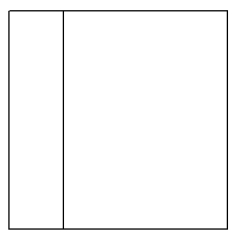
Figure 10:
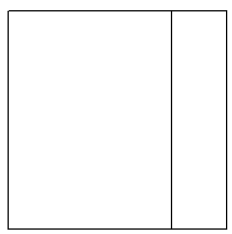
Figure 10:
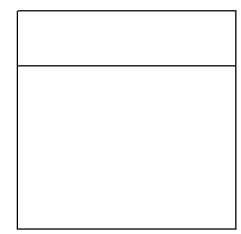
Figure 10:
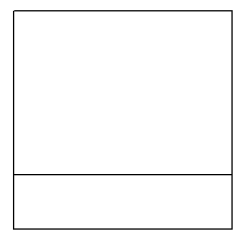

For example, if a coding block is generated by the quadtree partitioning, all of the quadtree partitioning, the binary tree partitioning, and the asymmetric binary tree partitioning may be allowed for the coding block. That is, if a coding block is generated based on quad tree partitioning, all partition types shown in FIG. 10 can be applied to the coding block. For example, a 2N×2N partition may represent a case where a coding block is not further divided, N×N may represent a case where a coding block is partitioned in a quad-tree, and N×2N and 2N×N may represent a case where a coding block is partitioned in a binary tree. In addition, nL×2N, nR×2N, 2N×nU, and 2N×nD may represent cases where a coding block is partitioned in an asymmetric binary tree.

On the other hand, when a coding block is generated by the binary tree partitioning, it may not be allowed to use the asymmetric binary tree partitioning for the coding block. That is, when the coding block is generated based on the binary tree partitioning, it may be restricted not to apply the asymmetric partition type (nL×2N, nR×2N, 2N×nU, 2N×nD) among the partition types shown in FIG. 10 to the coding block.

As described in the above example, a coding unit (or a coding tree unit) can be recursively divided by at least one vertical or horizontal line. For example, it can be summarized that quad tree partitioning is a method of dividing a coding block using a horizontal line and a vertical line, and a binary tree partitioning is a method of dividing a coding block using a horizontal line or a vertical line. A partition type of a coding block based on the quad tree partitioning and the binary tree partitioning is not limited to the example shown in FIG. 4 to FIG. 10, and an extended partition type other than the illustrated types can be used. That is, a coding block may be recursively divided in a type different from that shown in FIGS. 4 to 10. Hereinafter, various partition types of the coding block based on quad tree partitioning and binary tree partitioning will be described.

When a current block is quad tree partitioned, at least one of a horizontal line or a vertical line may divide the coding block asymmetrically. Here, asymmetry may mean that heights of blocks divided by a horizontal line are not the same or widths of blocks divided by a vertical line are not the same. For example, a horizontal line may divide a coding block into asymmetrical shapes while a vertical line divides the coding block into symmetric shapes, or a horizontal line may divide a coding block into symmetrical shapes while a vertical line divides the coding block into asymmetric shapes. Alternatively, both the horizontal line and the vertical line may divide a coding block asymmetrically.

Figure 11:
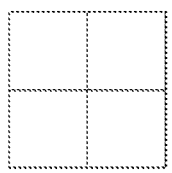
FIG. 11 is a diagram illustrating quad tree partition types of a coding block.
Figure 11:
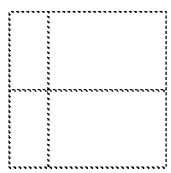
Figure 11:
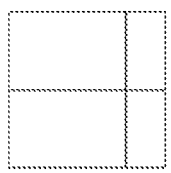
Figure 11:
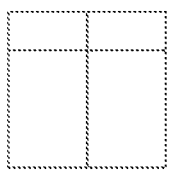
Figure 11:
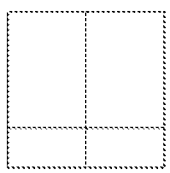

FIG. 11 is a diagram illustrating quad tree partition types of a coding block. In FIG. 11, a first example shows an example in which both a horizontal line and a vertical line are used for symmetric partitioning. A second example and a third example show examples in which a horizontal line is used for symmetric partitioning whereas a vertical line is used for asymmetric partitioning. A fourth example and a fifth example show examples in which a vertical line is used for symmetric partitioning while a horizontal line is used for asymmetric partitioning.

In order to specify a partition type of a coding block, information related to the partition type of the coding block may be encoded. Here, the information may include a first indicator indicating whether a partition type of a coding block is symmetric or asymmetric. The first indicator may be encoded in a unit of a block, or may be encoded for each vertical line or each horizontal line. For example, the first indicator may include information indicating whether a vertical line is to be used for symmetric partitioning and information indicating whether a horizontal line is to be used for symmetric partitioning.

Alternatively, the first indicator may be encoded only for a vertical line or a horizontal line, and a partition type of another line for which the first indicator is not encoded may be derived dependently by the first indicator. For example, the partition type of another line for which the first indicator is not encoded may have a value opposite to that of the first indicator. That is, if the first indicator indicates that a vertical line is used for asymmetric partitioning, it may be set to use a horizontal line for symmetric partitioning opposite to the first indicator.

It is also possible to further encode a second indicator for a vertical line or a horizontal line when the first indicator indicates asymmetric partitioning. Here, the second indicator may indicate at least one of a position of a vertical line or a horizontal line used for asymmetric partitioning or a ratio between blocks divided by the vertical line or the horizontal line.

Quad tree partitioning may be performed using a plurality of vertical lines or a plurality of horizontal lines. For example, it is also possible to divide a coding block into four blocks by combining at least one of one or more vertical lines or one or more horizontal lines.

Figure 12:
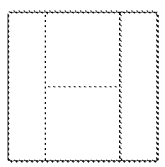
FIG. 12 is a diagram showing an example of dividing a coding block by combining a plurality of vertical lines/horizontal lines and one horizontal line/vertical line.
Figure 12:
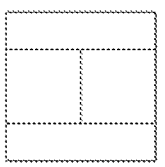
Figure 12:
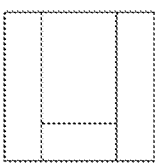
Figure 12:
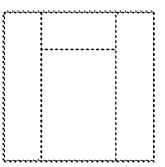
Figure 12:
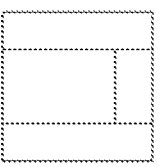
Figure 12:
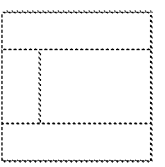

FIG. 12 is a diagram showing an example of dividing a coding block by combining a plurality of vertical lines/horizontal lines and one horizontal line/vertical line.

Referring to FIG. 12, quad tree partitioning is performed by dividing a coding block into three blocks by two vertical lines or two horizontal lines, and then dividing one of the three divided blocks into two blocks. At this time, as in the example shown in FIG. 12, a block located in a center among the blocks divided by two vertical lines or two horizontal lines can be divided by a horizontal line or a vertical line. It is also possible to divide a block located at one side of the coding block by using a horizontal or a vertical line. Alternatively, information (e.g., a partition index) for specifying a partition to be divided among the three partitions may be signaled through a bitstream.

At least one of a horizontal line or a vertical line may be used to divide a coding block asymmetrically, and the other may be used to divide the coding block symmetrically. For example, a plurality of vertical lines or a plurality of horizontal lines may be used to divide a coding block into symmetric shapes, or one horizontal line or one vertical line may be used to divide the coding block into symmetric shapes. Alternatively, both horizontal line and vertical line may be used to divide the coding block into symmetric shapes, or may be used to divide the coding block into asymmetric shapes.

When combining a plurality of vertical lines/horizontal lines and one horizontal line/one vertical line, the coding block can be divided into four partitions (i.e., four coding blocks) composed of at least two different sizes. A method of dividing a coding block into four partitions having at least two different sizes can be referred to as triple type asymmetric quad tree partitioning (Triple Type Asymmetric Quad-tree CU partitioning).

Information on the triple asymmetric quad tree partitioning may be encoded based on at least one of the first indicator or the second indicator described above. For example, the first indicator may indicate whether a partition type of a coding block is symmetric or asymmetric. The first indicator may be encoded in a unit of a block, or may be encoded each for a vertical line or a horizontal line. For example, the first indicator may include information indicating whether one or more vertical lines are to be used for symmetric partitioning and information indicating whether one or more horizontal lines are to be used for symmetric partitioning.

Alternatively, the first indicator may be encoded only for a vertical line or a horizontal line, and a partition type of another line for which the first indicator is not encoded may be derived by the first indicator.

It is also possible to further encode the second indicator for a vertical line or a horizontal line when the first indicator indicates asymmetric partitioning. Here, the second indicator may indicate at least one of a position of a vertical line or a horizontal line used for asymmetric partitioning or a ratio between blocks divided by a vertical line or a horizontal line.

A binary tree partitioning method in which the coding block is divided into a rectangular shaped partition and a non-rectangular shaped partition may be used. The binary tree partitioning method in which a coding block is recursively divided into a rectangular block and a non-rectangular block can be referred to as a polygonal binary tree partitioning (Polygon Binary Tree CU Partitioning).

Figure 13:
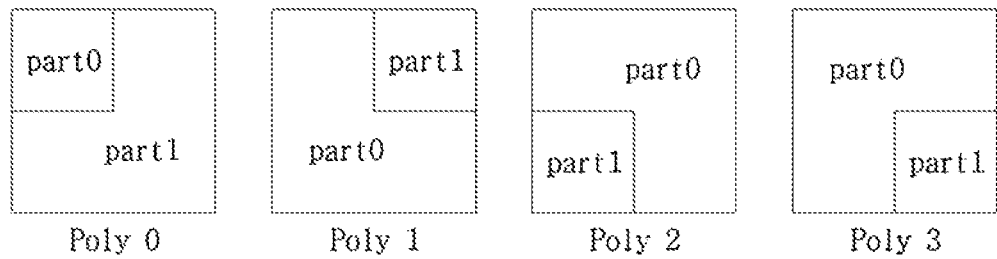
FIG. 13 is a diagram illustrating partition types according to polygonal binary tree partitioning.

FIG. 13 is a diagram illustrating partition types according to polygonal binary tree partitioning.

As in the example illustrated in FIG. 13, when a coding block is divided based on polygonal binary tree partitioning, the coding block can be divided into a square-shaped partition and a polygonal-shaped partition.

A partition type of a coding block may be determined based on an index specifying the partition type. For example, a partition type of a coding block may be determined based on index information indicating any one of Poly 0 to Poly 3 shown in FIG. 13.

Alternatively, a partition type of a coding block may be determined based on information specifying a position of a square block in the coding block. For example, when position information indicates that a square block in a coding block is located at a top-left from a center of the coding block, a partition type of the coding block may be determined as Poly 0 shown in FIG. 13.

It is also possible to generate a polygonal partition by merging a plurality of previously divided coding blocks. For example, when a coding block of 2N×2N type is divided into four sub-coding blocks of N×N type, it is possible to generate a polygonal type partition by merging any one of four sub-coding blocks and sub-coding blocks adjacent to the sub-coding block. Alternatively, when a coding block of 2N×2N type is divided into two sub-coding blocks of N×N type and one sub-coding block of 2N×N or N×2N type, a polygonal type partition may be generated by merging a sub-coding block of N×N type and the sub-coding block of 2N×N or N×2N type.

When a current coding block is divided based on polygonal binary tree partitioning, an index indicating a partition type of the current coding block or information indicating a position of a square block in the current coding block may be signaled, or information to construct a polygonal shaped partition in the current coding block may be signaled. Here, the information for constructing the polygonal shaped partition may include at least one of information indicating whether or not a divided block is to be merged with neighboring blocks, information regarding a position of a block and/or the number of blocks to be merged. The information for specifying the partition type may be signaled through at least one of a video parameter set, a sequence parameter set, a picture parameter set, a slice header, or a block level according to characteristics.

A divided coding block generated based on polygonal binary tree partitioning may be restricted so as not to be further divided. Alternatively, only a specific type of partitioning may be allowed for a divided coding block generated based on polygonal binary tree partitioning.

Information on whether polygonal binary tree partitioning is allowed may be signaled through at least one of a video parameter set, a sequence parameter set, a picture parameter set, a slice header, or a block level. For example, through a sequence header, a syntax isUsePolygonBinaryTreeFlag indicating whether polygonal binary tree partitioning is allowed may be signaled. If isUsePolygonBinaryTreeFlag is equal to 1, coding blocks in a current sequence can be divided based on polygonal binary tree partitioning.

Whether or not polygonal binary tree partitioning is to be used may be determined depending on whether or not binary tree partitioning is to be used. For example, if binary tree partitioning is not allowed (e.g., if isUseBinaryTreeFlag is 0), then polygonal binary tree partitioning may not be allowed. On the other hand, if binary tree partitioning is allowed, it may be determined whether polygonal binary tree partitioning is to be used according to a syntax of isUsePolygonBinaryTreeFlag indicating whether or not the polygonal binary tree partitioning to be is allowed.

A partition index of partitions generated by polygonal binary tree partitioning may be determined according to locations of partitions. For example, a partition including a predetermined location may have a partition index precede to a partition which does not including the predetermined location. For example, as in the example shown in FIG. 13, it may be set that a partition including a position of a top left sample of a coding block may have partition index 0, and the other partition may have partition index 1. Alternatively, a partition index of each partition may be determined according to a size of the partition.

When a coding block is divided by polygonal binary tree partitioning, an encoding/decoding order of each partition may follow a partition index. That is, after encoding partition 0 firstly, partition 1 can be encoded in a next order. Alternatively, the partition 0 and the partition 1 may be encoded/decoded in parallel.

At this time, in case of performing a prediction for a polygonal partition, it is possible to divide the polygonal partition into sub-partitions and the prediction can be performed in a unit of a sub-partition.

Figure 14:
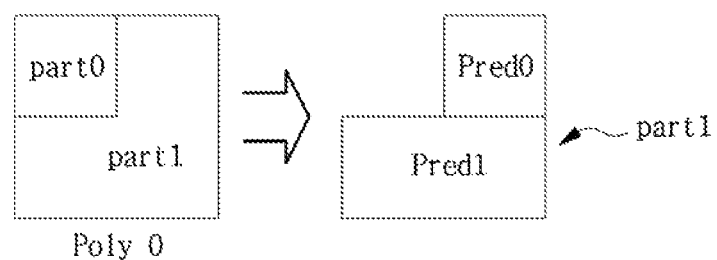
FIG. 14 is a diagram illustrating an example in which a polygonal partition is divided into sub-partitions.

FIG. 14 is a diagram illustrating an example in which a polygonal partition is divided into sub-partitions.

When intra prediction is performed on a polygonal partition, the polygonal partition may be divided into sub-blocks in a shape of a rectangle, as in the example shown in FIG. 14. The polygonal partition may be divided into a square shaped partition and a non-square shaped partition, as in the example shown in FIG. 14, or may be divided into square shaped partitions though not shown in the drawing.

When a polygonal partition is divided into a plurality of partitions, intra prediction may be performed on each of the divided partitions. For example, in the example shown in FIG. 14, intra prediction may be performed on each of Pred 0 and Pred 1.

Intra prediction modes of Pred 0 and Pred 1 may be determined differently, but reference samples of each partition may be derived based on a polygonal partition or a coding block. Alternatively, it may derive an intra prediction mode of Pred 1 based on an intra prediction mode of Pred 0, or may derive an intra prediction mode of Pred 0 based on an intra prediction mode of Pred 1.

The asymmetric quad tree partitioning, the polygonal type binary tree partitioning, and the like described above can be defined as extended types of quadtree partitioning and binary tree partitioning. Whether or not an extended partition type is to be used can be determined in a sequence unit, a picture unit, a slice unit, or a block level, or it can be determined depending on whether quad tree partitioning is allowed or whether binary tree partitioning is allowed.

In the above example, it is assumed that a coding block is divided into four or two partitions. However, it is also possible to recursively divide a coding block into a larger number of partitions or a fewer number of partitions. For example, the number of vertical lines or horizontal lines may be adjusted and a coding block may be divided into two partitions or three partitions using only vertical line(s) or horizontal line(s). For example, if one horizontal line or one vertical line is used, a coding block may be divided into two partitions. At this time, depending on whether or not a size of each partition is the same, it can be determined whether a partition type of the coding block is an asymmetric binary partition or a symmetric binary partition. As another example, a coding block may be partitioned into three partitions by using two vertical lines or two horizontal lines. Dividing a coding block into three partitions using two vertical lines or two horizontal lines can be referred to as triple tree partitioning.

Figure 15:
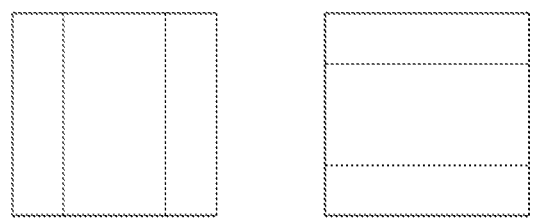
FIG. 15 shows an example in which a coding block is partitioned based on a triple tree.

FIG. 15 shows an example in which a coding block is partitioned based on a triple tree. As in the example shown in FIG. 15, as the coding block is divided by two horizontal lines or two vertical lines, three partitions can be generated.

Coding blocks generated by triple tree partitioning may be further divided into sub-coding blocks, or may be further divided into smaller units for prediction or transform.

In another example, a coding block generated by triple tree partitioning may be restricted so as not to be further divided. Alternatively, a coding block generated by triple tree partitioning may be restricted such that some of quad tree partitioning, triple tree partitioning, or binary tree partitioning is not applied.

Depending on a size or a shape of a coding block, it may be determined whether triple tree partitioning is allowed. For example, triple tree partitioning can be limitedly allowed when a size of a coding block is M×N. Here, N and M are natural numbers and N and M may be the same or may be different from each other. For example, N and M may have values of 4, 8, 16, 32, 64, or more.

Information indicating a size or a shape of a block for which triple tree partitioning is allowed may be encoded and transmitted through the bitstream. At this time, the information may represent a maximum value or a minimum value. Alternatively, a size or a shape of a block for which triple tree partitioning is allowed may have a fixed value pre-agreed in the encoder/decoder.

Information indicating whether triple tree partitioning is allowed may be signaled in a unit of a picture, a slice, or a block. Information indicating whether the triple tree partitioning is to be applied may be signaled to a block included in the predetermined unit only when the information indicates that the triple tree partitioning for the predetermined unit is allowed.

The information indicating whether the triple tree partitioning is to be applied may be a flag of 1 bit. For example, triple_split_flag may indicate whether a current coding block is to be divided based on a triple tree. When the current coding block is divided based on the triple tree, information indicating a partitioning direction or information indicating a size/ratio of each partition can be additionally signaled. The information indicating the partitioning direction may be used to determine whether a coding block is to be divided by two horizontal lines or whether a coding block is to be divided by two vertical lines.

When a coding block is divided based on a triple tree, partitions included in the coding block may share motion information, a merge candidate, reference samples, or an intra prediction mode according to a size or a shape of the coding block. For example, if a current coding block is divided based on triple tree partitioning and a size or a shape of the current coding block satisfies a predetermined condition, coding blocks in the current coding block may share at least one of a spatial neighboring block candidate or a temporal neighboring block candidate for inter prediction, reference samples or an intra prediction mode for intra prediction. Alternatively, only some of coding blocks in the current coding block may share the information, and remaining coding blocks may do not share the information.

The method of dividing a coded block using at least one of quad tree partitioning, binary tree partitioning, or triple tree partitioning may be referred to as multi-tree partitioning. Under the multi-tree partitioning method, a coding unit can be divided into a plurality of partitions using at least one of quad tree partitioning, binary tree partitioning, or triple tree partitioning. Each partition generated by dividing a coding block can be defined as a coding unit.

Figure 16:
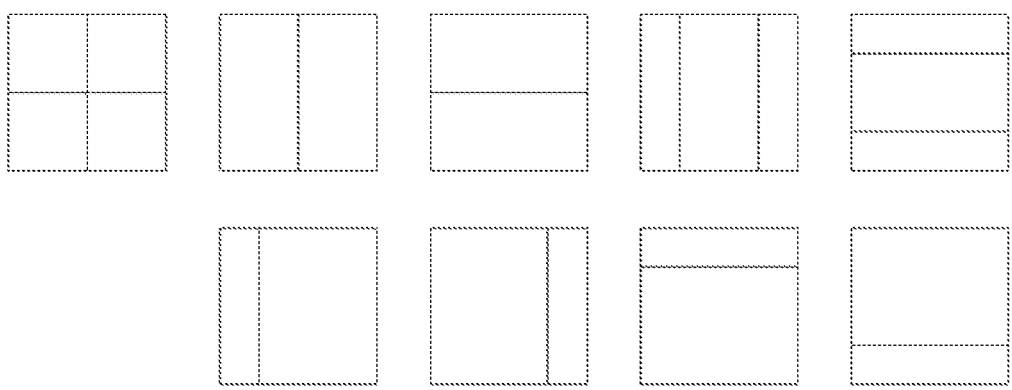
FIG. 16 and FIG. 17 illustrate partition types of a coding block according to a multi-tree partitioning method.
Figure 17:
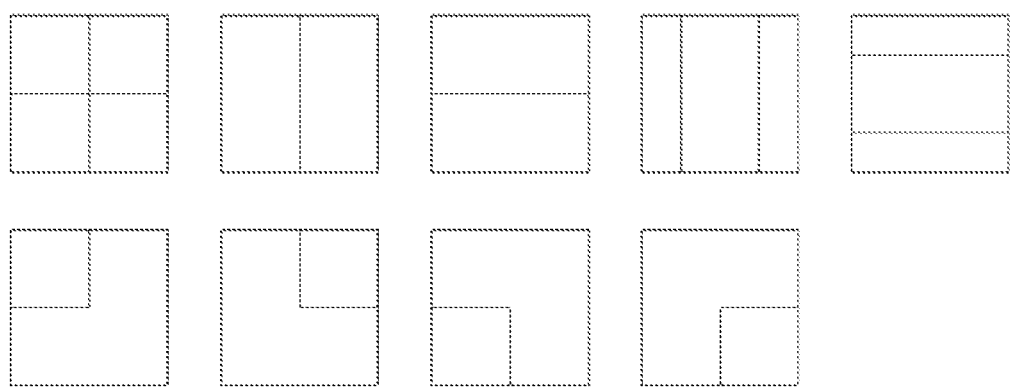

FIG. 16 and FIG. 17 illustrate partition types of a coding block according to a multi-tree partitioning method. Nine partition types according to quad tree partitioning, binary partitioning, and triple tree partitioning are illustrated in FIG. 16.

If polygonal type binary tree partitioning is included in a category of the multi-tree partitioning, a coding block may be divided into a plurality of partitions based on at least one of quad tree partitioning, binary tree partitioning, triple tree partitioning and polygonal type binary tree partitioning. Thus, a coding block may have a partition type as in the example illustrated in FIG. 17.

Only a predefined partition type, illustrated in examples in FIG. 16 or FIG. 17, can be set to be available under the multi-tree partitioning method. However, the predefined partition type is not limited to the examples shown in FIG. 16 or FIG. 17.

Under the multi-tree partitioning method, whether to use each of quad tree partitioning, binary tree partitioning, and triple tree partitioning may be determined in a unit of a sequence, a picture, or a slice. For example, whether to use quad tree partitioning, binary tree partitioning, and triple tree partitioning can be determined based on flag information indicating whether or not each partitioning method is to be used. In accordance with the determination, blocks included in a predetermined unit (i.e., a sequence, a picture, a slice, or the like) may be partitioned using all of the quad tree partitioning, the binary tree partitioning, and the triple tree partitioning, or blocks included in the predetermined unit may be partitioned using one or two of the quad tree partitioning, binary tree partitioning and the triple tree partitioning.

Alternatively, some of quad tree partitioning, binary tree partitioning, and triple tree partitioning may be used as defaults, and whether to use the remaining partitioning methods may be selectively determined. For example, quad tree partitioning is used as default, but whether to use binary tree partitioning or triple tree partitioning may be selectively determined. Or, quad tree partitioning and triple tree partitioning are used as defaults, but whether to use binary tree partitioning may be selectively determined. Or, quad tree partitioning and binary tree partitioning are used as defaults, but whether or not to use triple tree partitioning may be selectively determined.

An indicator indicating whether to use a binary tree partitioning method or a triple tree partitioning method may be a flag of 1 bit. For example, isUseBinaryTreeFlag indicates whether binary tree partitioning is to be used, and isUseTripleTreeFlag indicates whether triple tree partitioning is to be used.

The indicator may be signaled through a sequence header. For example, if a value of isUseBinaryTreeFlag is 1, binary tree partitioning may be used for coding units in a current sequence. Alternatively, if a value of isUseTripleTreeFlag is 1, triple tree partitioning may be used for coding units in a current sequence. Beyond the above example, the indicator may be signaled via a video parameter set, a picture parameter set, a slice header, or a block level.

A partition type of a current coding block may be restricted so as not to generate a larger number of partitions than a partition type of an upper node. For example, if a current coding block is generated by triple tree partitioning, only triple tree partitioning or binary tree partitioning is allowed for the current coding block, and quad tree partitioning is not allowed for the current coding block.

In addition, information indicating whether or not a current coding block is to be divided may be hierarchically encoded/decoded according to the number of partitions generated as a result of partitioning. For example, information indicating whether a current coding block is to be divided based on a quad tree is encoded/decoded, and if it is determined that the current block is not divided based on the quad tree, then information whether to divide based on a triple tree or information whether to divide based on a binary tree may be encoded/decoded.

It is also possible to divide a coding block into four or more blocks by combining a plurality of horizontal lines and a plurality of vertical lines instead of examples described above.

Figure 18:
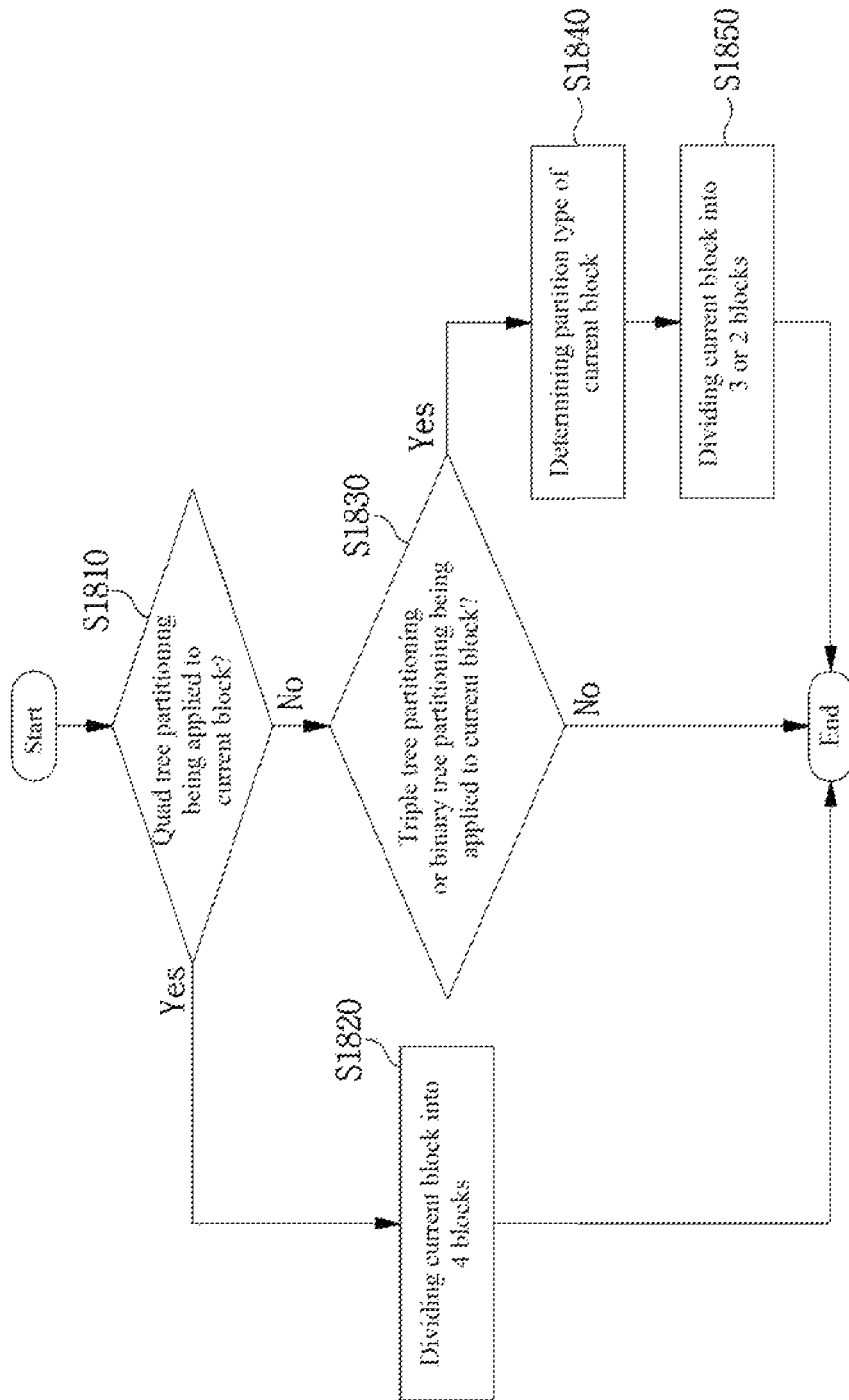
FIG. 18 is a flowchart illustrating partitioning processes of a coding block according to an embodiment of the present invention.

FIG. 18 is a flowchart illustrating partitioning processes of a coding block according to an embodiment of the present invention.

First, it may be determined whether quad tree partitioning is performed on a current block S1810. If it is determined that quad tree partitioning is to be performed on the current block, the current block may be divided into four coding blocks S1820.

Figure 19:
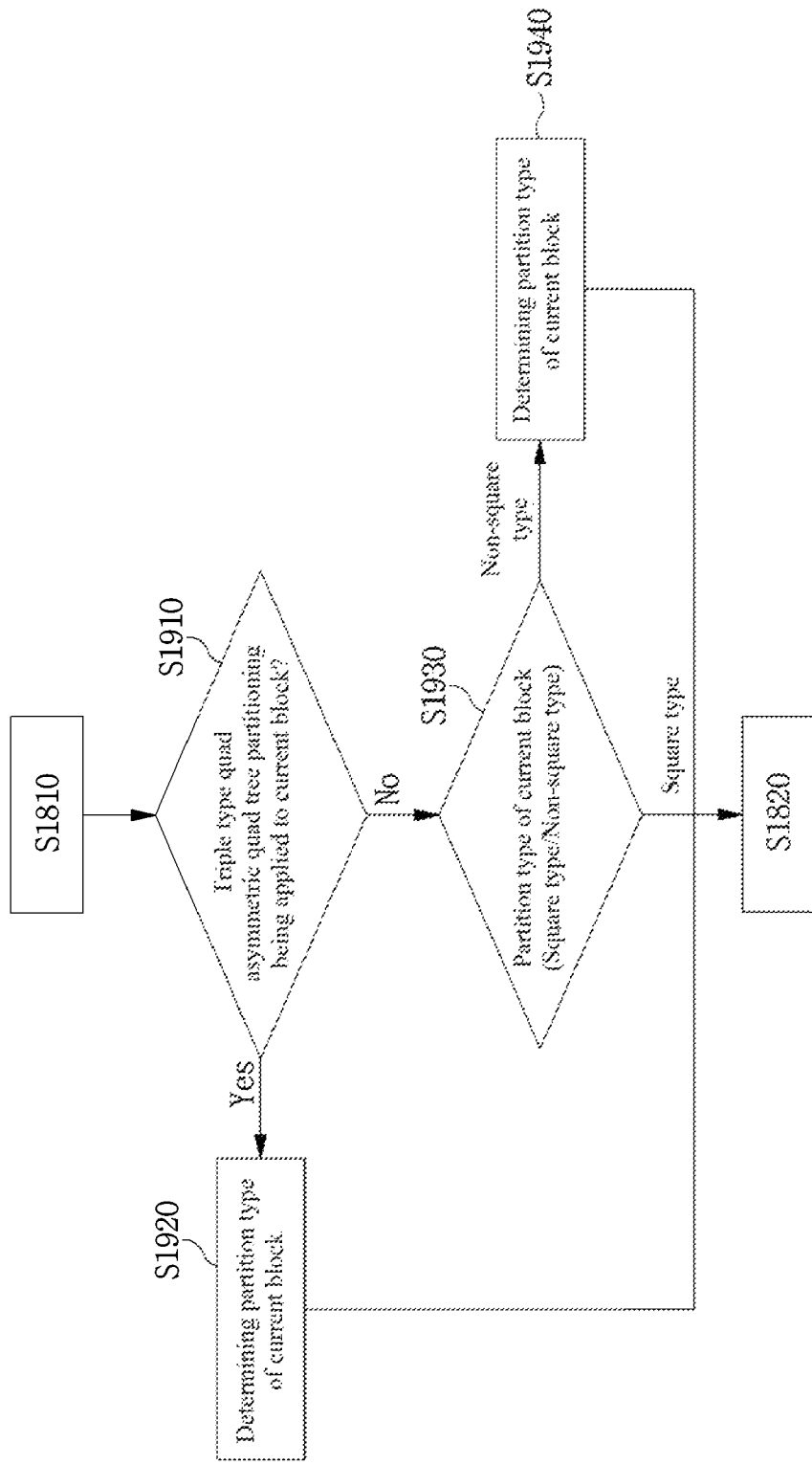
FIG. 19 is a flowchart illustrating processes of determining a partition type of quad tree partitioning according to an embodiment of the present invention.

In dividing the current block into four blocks, processes of FIG. 19 may be additionally performed to determine a partition type of the current block.

First, in dividing a current block into four coding blocks, it may be determined whether or not triple type asymmetric quad tree partitioning is to be applied to the current block S1910. If the triple type asymmetric quad tree partitioning is applied to the current block, a partition type of the current block may be determined based on the number or a location of vertical lines/horizontal lines dividing the current block S1920. For example, if the triple type asymmetric quad tree partitioning is applied to the current block, the current block may be divided into four partitions by two vertical lines and one horizontal line, or two horizontal lines and one vertical line.

If the triple type asymmetric quad tree partitioning is not applied, it may be determined whether a partition type of the current block is a square type or a non-square type S1930. Here, whether or not the partition type of the current block is the square type or the non-square type may be determined based on whether at least one of a vertical line and a horizontal line dividing the current block divides the current block symmetrically. If the current block is divided into the non-square type, the partition type of the current block may be determined based on a position of the vertical line/horizontal line dividing the current block S1940.

On the other hand, if it is determined that the quad tree partitioning is not allowed for the current block, it may be determined whether tree tree partitioning or binary tree partitioning is performed on the current block S1830.

If it is determined that the triple tree partitioning or the binary tree partitioning is performed for the current block, a partition type of the current block may be determined. At this time, the triple tree partition type or the binary tree partition type of the current block may be determined based on at least one of information indicating a partitioning direction of the current block, or index information specifying a partition type.

The current block may be divided into three or two blocks according to the determined triple tree or binary partition type S1840.

In the above-described example, it is illustrated that it is selectively determined whether to apply the triple tree partitioning or the binary tree partitioning after determination of whether to apply the quad tree partitioning, but the present invention is not limited to the illustrated embodiment. Unlike the illustrated example, it is also possible to hierarchically determine whether to apply the triple tree partitioning or whether to apply the binary tree partitioning. For example, it may be determined in advance whether the current block is to be divided based on a triple tree and if it is determined that the current block is not divided based on the triple tree, then determination of whether or not the current block is to be divided based on a binary tree is performed. Alternatively, it is possible to preferentially determine whether or not the current block is to be divided based on the binary tree and if it is determined that the current block is not divided based on the binary tree, then determination of whether or not the current block is to be divided based on the triple tree may be performed.

Figure 20:
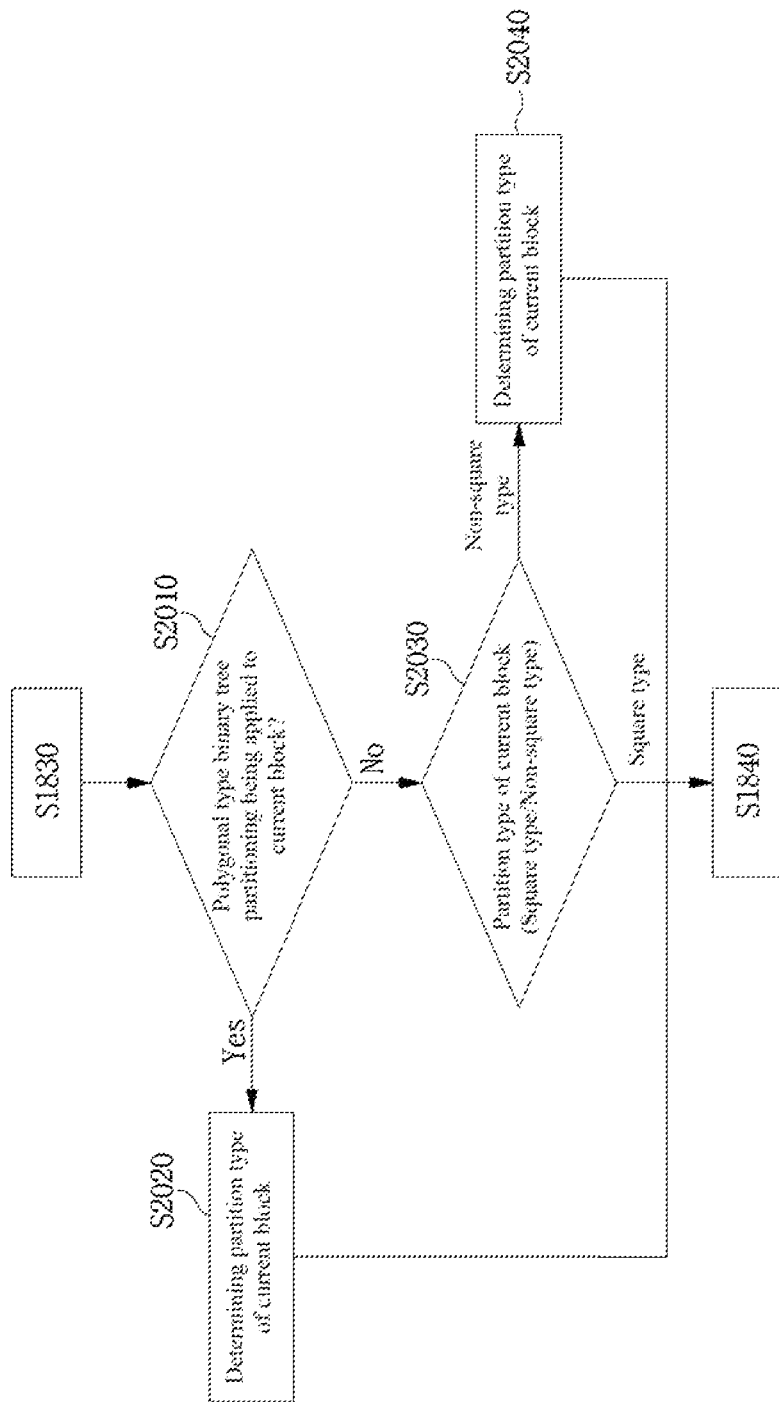
FIG. 20 is a flowchart illustrating processes of determining a partition type of binary tree partitioning according to an embodiment of the present invention.

In dividing the current block into two blocks, processes of FIG. 20 may be additionally performed to determine a partition type of the current block.

First, in dividing the current block into two coding blocks, it may be determined whether or not polygonal binary tree partitioning is to be applied to the current block S2010. If the polygonal binary tree partitioning is applied to the current block, a partition type of the current block may be determined based on an index indicating the partition type of the current block or a location of a partition of a rectangular shape S2020. For example, if the polygonal binary tree partitioning is applied to the current block, the current block may be partitioned into one rectangular shaped partition and one non-rectangular shaped partition.

If the polygonal binary tree partitioning is not applied, it may be determined whether the partition type of the current block is a square type or a non-square type S2030. Here, whether or not the partition type of the current block is the square type or the non-square type may be determined by whether at least one of a vertical line or a horizontal line dividing the current block divides the current block into a symmetrical form. If the current block is divided into non-square blocks, the partition type of the current block may be determined based on the position of the vertical line or the horizontal line dividing the current block S2040.

As an example illustrated in FIG. 20, it is also possible to sequentially determine whether or not binary tree partitioning is performed for the current block and whether or not asymmetric binary tree partitioning is performed for the current block. For example, it can be determined whether or not to perform asymmetric binary tree partitioning only when it is determined that the binary tree partitioning is not allowed to the current block.

The above description has been made on the case where the coding block is recursively divided through quad tree partitioning, binary tree partitioning, or triple tree partitioning. The described partitioning method may be applied to divide a coding block into prediction blocks or transform blocks, or may be applied to divide a prediction block or a transform block recursively. For example, a coding block may be divided into a plurality of prediction blocks or a plurality of transform blocks through quad tree partitioning, binary tree partitioning, or triple tree partitioning.

Figure 21:
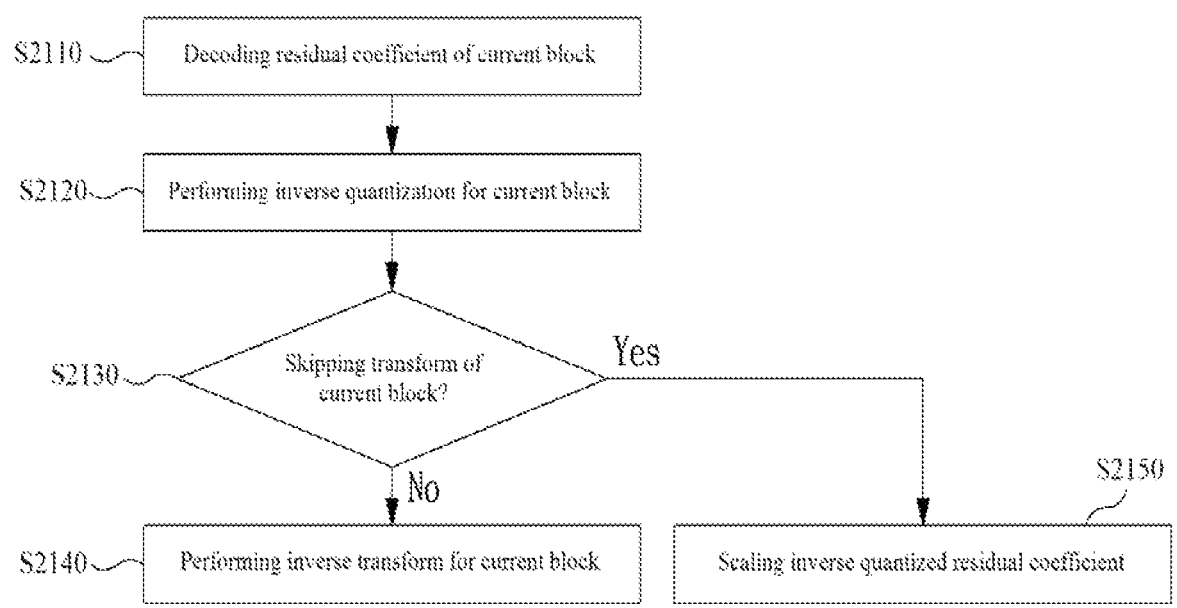
FIG. 21 is a flowchart illustrating processes of obtaining a residual sample according to an embodiment to which the present invention is applied.

FIG. 21 is a flowchart illustrating processes of obtaining a residual sample according to an embodiment to which the present invention is applied.

First, a residual coefficient of a current block may be obtained S2110. A decoder may obtain a residual coefficient through a coefficient scanning method. For example, the decoder may perform a coefficient scan using a diagonal scan, a jig-zag scan, an up-right scan, a vertical scan, or a horizontal scan, and may obtain residual coefficients in a form of a two-dimensional block.

An inverse quantization may be performed on the residual coefficient of the current block S2120.

It is possible to determine whether to skip an inverse transform on the dequantized residual coefficient of the current block S2130. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block S1240. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value S2150.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
determining whether it is allowed to divide a current block into two partitions or not;
when it is determined that a division of the current block is allowed, determining whether to divide the current block into the two partitions or not;
when it is determined that the current block is to be divided, decoding a first indicator of 1-bit indicating whether the current block is divided in a symmetric form or in an asymmetric form;
dividing the current block in a vertical direction or in a horizontal direction so as to generate the two partitions; and
performing an inverse-transform for one of the two partitions,
wherein when the first indicator indicates that the current block is divided in the asymmetric form, the current block is divided into a first partition having ¼ size of the current block and a second partition having ¾ size of the current block, and
wherein locations of the first partition and the second partition are determined based on a second indicator of 1-bit decoded from a bitstream.

2. The method of claim 1, wherein when the current block is divided in the horizontal direction, it is determined based on the second indicator which of the first partition and the second partition is located at an upper side of the current block, and
when the current block is divided in the vertical direction, it is determined based on the second indicator which of the first partition and the second partition is located at a left side of the current block.

3. The method of claim 1, wherein it is determined based on a size of the current block whether both the symmetric form and the asymmetric form are applicable to the current block or only the symmetric form is applicable to the current block.

4. The method of claim 1, wherein whether the division of the current block is allowed or not is determined based on an enabled flag.

5. A method of encoding a video, the method comprising:
determining whether it is allowed to divide a current block into two partitions or not;
when it determined that a division of the current block is allowed, determining whether to divide the current block into the two partitions or not;
when it is determined to divide the current block, determining whether the current block is divided in a symmetric form or in an asymmetric form, a first indicator of 1-bit indicating whether the current block is divided in the symmetric form or in the asymmetric form being encoded in a bitstream;
dividing the current block in a vertical direction or in a horizontal direction so as to generate the two partitions;
performing a transform for one of the two partitions,
wherein when it is determined to divide the current block in the asymmetric form, the current block is divided into a first partition having ¼ size of the current block and a second partition having ¾ size of the current block, and
wherein a second indicator of 1-bit which is used to determine locations of the first partition and the second partition is encoded in the bitstream.

6. The method of claim 5, wherein when the current block is divided in the horizontal direction, the second indicator is used to determine which of the first partition and the second partition is located at an upper side of the current block, and
when the current block is divided in the vertical direction, the second indicator is used to determine which of the first partition and the second partition is located at a left side of the current block.

7. The method of claim 5, wherein it is determined based on a size of the current block whether both the symmetric form and the asymmetric form are applicable to the current block or only the symmetric form is applicable to the current block.

8. The method of claim 5, wherein the method further comprises encoding an enabled flag indicating whether the division of the current block is allowed or not.

9. A non-transitory computer-readable medium for storing compressed data associated with a video signal, the compressed data comprising:
a first indicator of 1-bit indicating whether a current block is divided in a symmetric form or in an asymmetric form,
wherein the first indicator is decoded from the compressed data when it is determined that it is allowed to divide the current block into two partitions and the current block is to be divided into the two partitions,
wherein the current block is divided in a vertical direction or in a horizontal direction so as to generate the two partitions,
wherein an inverse-transform is performed for one of the two partitions,
wherein when the first indicator indicates that the current block is divided in the asymmetric form, the current block is divided into a first partition having ¼ size of the current block and a second partition having ¾ size of the current block, and
wherein locations of the first partition and the second partition are determined based on a second indicator of 1-bit included in the compressed data.

* * * * *